United States Patent
Yamamoto

(12) 
(10) Patent No.: US 9,407,783 B2
(45) Date of Patent: Aug. 2, 2016

(54) IMAGE FORMING APPARATUS

(71) Applicant: KYOCERA Document Solutions Inc., Osaka (JP)

(72) Inventor: Yuki Yamamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/606,332

(22) Filed: Jan. 27, 2015

(65) Prior Publication Data
US 2015/0222772 A1 Aug. 6, 2015

(30) Foreign Application Priority Data
Jan. 31, 2014 (JP) ................................. 2014-016488

(51) Int. Cl.
*H04N 1/00* (2006.01)
*H04N 1/21* (2006.01)
*H04N 1/23* (2006.01)

(52) U.S. Cl.
CPC ............. *H04N 1/00832* (2013.01); *H04N 1/21* (2013.01); *H04N 1/2338* (2013.01); *H04N 2201/0094* (2013.01)

(58) Field of Classification Search
CPC ... H04N 1/00832; H04N 1/2338; H04N 1/21; H04N 2201/0094
USPC ....................................... 358/1.13, 1.15, 1.17
See application file for complete search history.

(56) References Cited

U.S. PATENT DOCUMENTS

2006/0109493 A1* 5/2006 Toda .................... H04N 1/2187
358/1.13

FOREIGN PATENT DOCUMENTS

JP 2000-339114 A 12/2000

* cited by examiner

*Primary Examiner* — Kent Yip
(74) *Attorney, Agent, or Firm* — Studebaker & Brackett PC

(57) ABSTRACT

An image forming apparatus includes an acquiring section, a storing section, a total-calculating section, a determining section, and an image forming section. The acquiring section acquires, from each of one or more pre-designated target persons, a printing requirement notification indicating whether or not the target person requires printing, and further indicating a number of required copies when the target person requires printing. The storing section stores output target data. The total-calculating section calculates, based on one or more printing requirement notifications acquired by the acquiring section, a total number of required copies indicated by the printing requirement notifications. The determining section determines a final number of copies to be printed based on a calculation result of the total-calculating section. The image forming section prints an image based on the output target data in accordance with the final number of copies determined by the determining section.

6 Claims, 5 Drawing Sheets

IMAGE FORMING APPARATUS

INCORPORATION BY REFERENCE

The present application claims priority under 35 U.S.C. §119 to Japanese Patent Application No. 2014-016488, filed Jan. 31, 2014. The contents of this application are incorporated herein by reference in their entirety.

BACKGROUND

The present disclosure relates to an image forming apparatus.

In recent years use of multifunction peripherals (MFPs) having functions such as a scanning function, a facsimile function, a printing function, and a copying function has become common in offices and other locations. An MFP is often used in a state in which the MFP is connected to an information processing terminal, such as a personal computer, via a network, such as a local area network (LAN). The MFP for example functions as an image forming apparatus by printing an image on paper based on image data input from the information processing terminal. The MFP may for example also function as an image reading device by reading a document loaded on a document table and thereby generating image data that can be used by the information processing terminal. The MFP may for example also function as a document managing apparatus by accumulating searchable image data such as documents.

In order to print image data such as a document stored in the MFP, a user of the MFP for example uses the information processing terminal to input a printing instruction designating the image data as a printing target. In a situation in which a plurality of users can access a shared document which is stored in the MFP as image data, each of the users who can access the shared document is able to print the shared document. When the shared document is for example materials to be used at a meeting and permission to access the shared document is granted to each person scheduled to attend the meeting, each of the aforementioned persons can print the shared document as required.

Unfortunately, if each attendee of the meeting individually inputs a printing instruction to the MFP with respect to the shared document, there may be an adverse effect on efficiency of use of the MFP or network resources. The above issue can for example be combated through a printing system that is instructable to perform single-batch printing. In the aforementioned system, when a user inputs a printing job to a printing apparatus and designates the printing job for single-batch printing, the user also inputs an explanation pertaining to an output document to be output through the printing job (target output document) and an application deadline for single-batch printing. The input information is displayed by an information processing terminal on which a client program has been introduced. If a user of the information processing terminal desires that the target output document be printed, the user inputs a number of copies required thereby and applies for printing of the target output document. Once the application deadline has passed, the sum total of the number of initially designated copies and the number of copies input to the information processing terminal having the client program introduced thereon is set as the number of copies to be printed and the printing job is executed for the set number of copies.

SUMMARY

An image forming apparatus according to one aspect of the present disclosure includes an acquiring section, a storing section, a total-calculating section, a determining section, and an image forming section. The acquiring section acquires, from each of one or more pre-designated target persons, a printing requirement notification indicating whether or not the target person requires printing, and further indicating a number of required copies when the target person requires printing. The storing section stores output target data. The total-calculating section calculates, based on one or more printing requirement notifications acquired by the acquiring section, a total number of required copies indicated by the printing requirement notifications. The determining section determines a final number of copies to be printed based on a calculation result of the total-calculating section. The image forming section prints an image based on the output target data in accordance with the final number of copies determined by the determining section.

DETAILED DESCRIPTION

The following explains an embodiment of the present disclosure with reference to the drawings.

Figure 1:
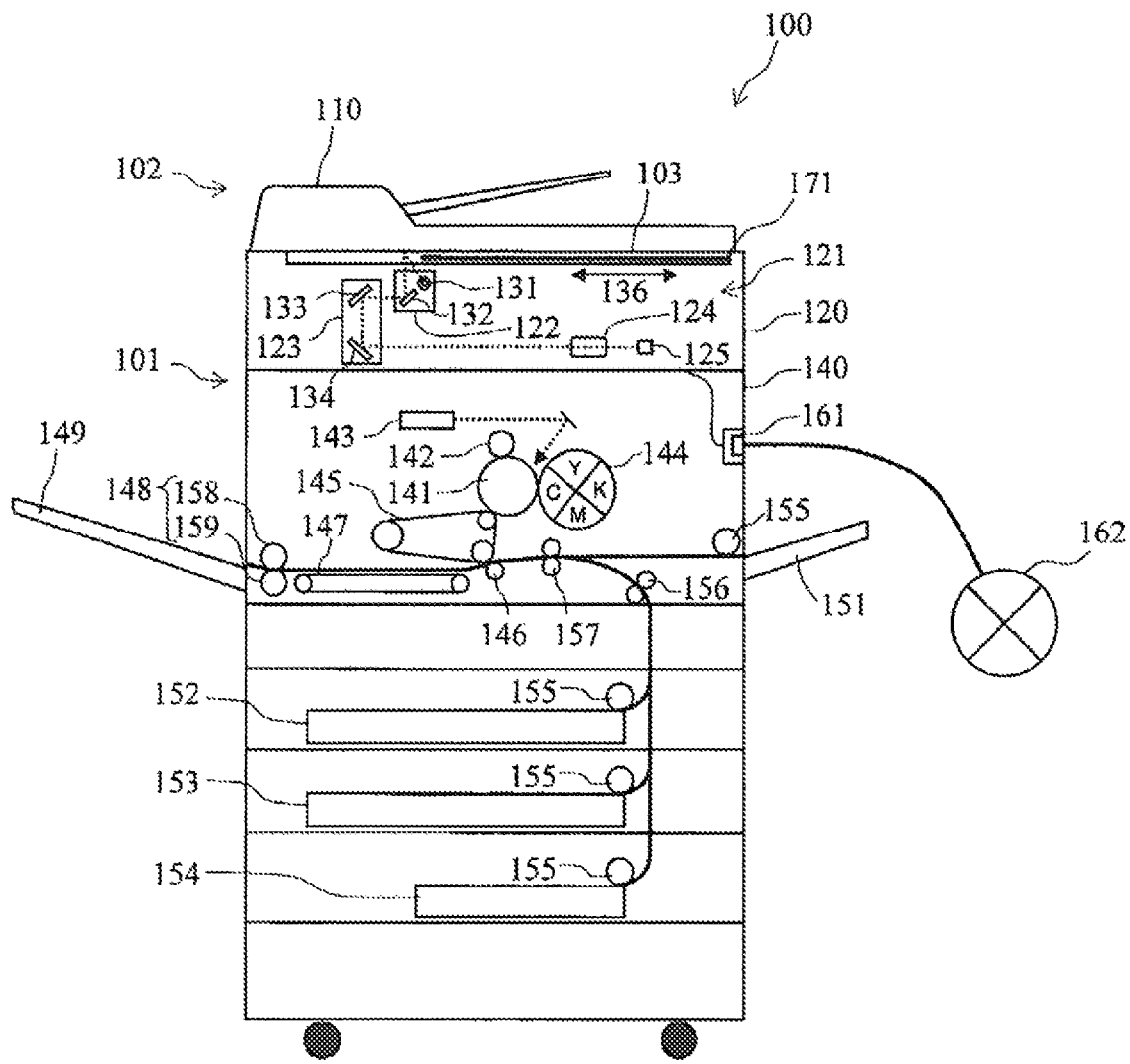
FIG. 1 illustrates general configuration of an MFP according to an embodiment.

FIG. 1 illustrates general configuration of an MFP 100 (i.e., an example of an image forming apparatus) according to the present embodiment.

As illustrated in FIG. 1, the MFP 100 includes a main body 101 and an openable and closable platen cover 102 attached above the main body 101. The main body 101 includes an image reading section 120 and an image forming section 140. A document table 103 made from a transparent sheet such as contact glass is located on an upper surface of the main body 101. Opening (raising) of the platen cover 102 exposes the document table 103 such that a user can load a document onto the document table 103. The platen cover 102 includes a document conveying device 110. An operation panel 171 is located on a front surface of the MFP 100. The user can use the operation panel 171 to give instructions to the MFP 100, such as to start coping, and to check the status or settings of the MFP 100.

The image reading section 120 is located below the document table 103. The image reading section 120 reads an image of a document through an optical scanning system 121 and thereby generates digital data (image data) for the image. The document is loaded onto the document table 103 or the document conveying device 110. The optical scanning system 121 includes a first carriage 122, a second carriage 123, and a condensing lens 124. The first carriage 122 includes a linear light source 131 and a mirror 132. The second carriage 123 includes mirrors 133 and 134. The light source 131 illuminates the document. The mirrors 132, 133, and 134 guide reflected light from the document to the condensing lens 124. The condensing lens 124 condenses the reflected light guided by the mirrors 132, 133, and 134, and forms an image on a light-receiving surface of a line image sensor 125.

The first carriage 122 and the second carriage 123 in the optical scanning system 121 can move in a sub-scanning direction 136. The image sensor 125 can read an image of a document on the document table 103 through movement of the first carriage 122 and the second carriage 123 in the sub-scanning direction 136. When an image of a document loaded in the document conveying device 110 is to be read, the first carriage 122 and the second carriage 123 temporarily remain stationary at positions in accordance with an image reading position. The image reading section 120 reads the image on the document, through the image sensor 125, as the document passes the image reading position while being conveyed by the document conveying device 110. The image sensor 125 generates image data for the document corresponding to, for example, red (R), green (G), and blue (B) colors, based on an optical image incident on the light-receiving surface.

The generated image data is for example printed on paper by the image forming section 140. Also, the generated image data may for example be transmitted to another apparatus (not illustrated) via a network 162.

The image forming section 140 prints an image on paper based on image data which is for example generated by the image reading section 120 or received from another apparatus connected via the network 162. The image forming section 140 includes a photosensitive drum 141. The photosensitive drum rotates in one direction at a constant speed. A charging device 142, a light-exposing device 143, a developing device 144, and an intermediate transfer belt 145 are located around the photosensitive drum 141. The charging device 142 applies a uniform charge across the surface of the photosensitive drum 141. The light-exposing device 143 irradiates the uniformly charged surface of the photosensitive drum 141 with a light beam in accordance with the input image data, thereby forming an electrostatic latent image on the photosensitive drum 141. The developing device 144 causes toner to adhere to the electrostatic latent image formed on the photosensitive drum 141, thereby forming a toner image on the photosensitive drum 141. The intermediate transfer belt 145 transfers the toner image on the photosensitive drum 141 onto a sheet of paper. In a situation in which the image data is for a color image, the intermediate transfer belt 145 transfers a plurality of toner images of different colors onto the sheet such as to be superposed on one another. Note that RGB format image data is converted to CMYK (cyan, magenta, yellow, and black) format image data and the converted image data is input to the light-exposing device 143.

The image forming section 140 feeds a sheet from a manual feed tray 151 or any one of paper feed cassettes 152, 153, and 154 to a transferring section between the intermediate transfer belt 145 and a transfer roller 146. Sheets of various different sizes are loaded or stored in the manual feed tray 151 and the paper feed cassettes 152, 153, and 154. The image forming section 140 selects a sheet based on a sheet designation made by the user, or based on an automatically detected size of the document, and feeds the selected sheet from the manual feed tray 151 or one of the paper feed cassettes 152, 153, and 154. The fed sheet is conveyed to the transferring section by conveyance rollers 156 and registration rollers 157. Once a toner image has been transferred onto the sheet, the sheet is conveyed to a fixing device 148 by a conveyance belt 147. The fixing device 148 includes a fixing roller 158 having an internal heater and a pressure roller 159. The fixing device 148 fixes the toner image to the sheet through heat and pressure. Once the sheet has passed through the fixing device 148, the image forming section 140 ejects the sheet onto an exit tray 149.

Figure 2:
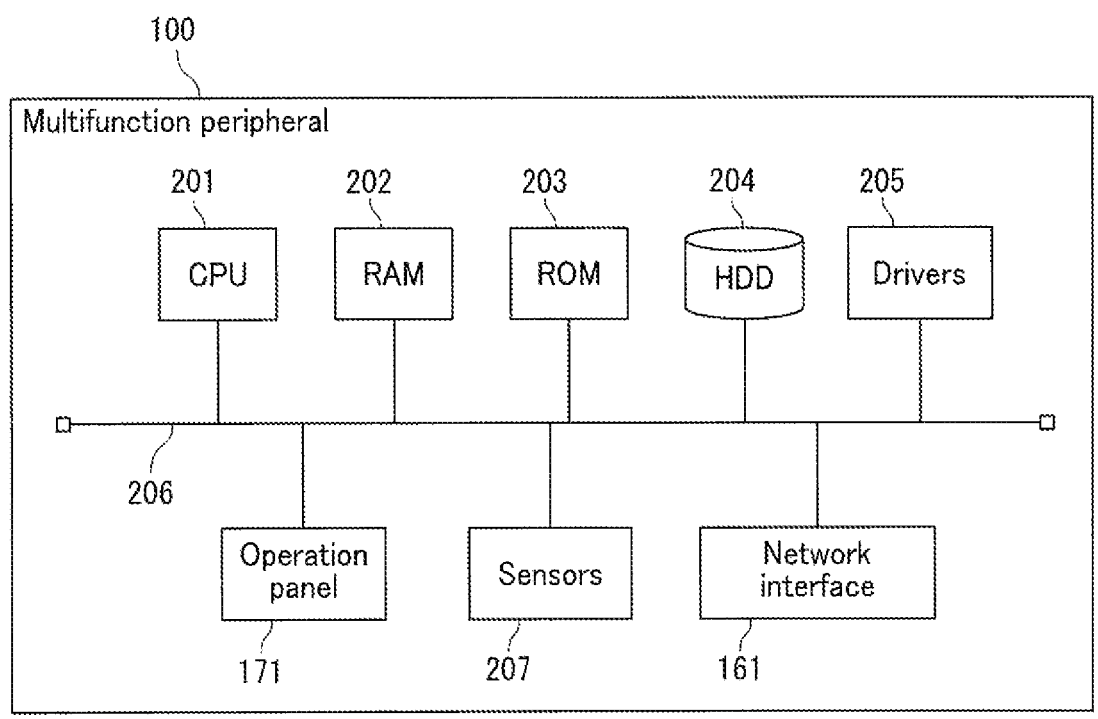
FIG. 2 illustrates hardware configuration of an MFP according to an embodiment.

FIG. 2 illustrates hardware configuration of the MFP 100 according to the embodiment.

The MFP 100 further includes, in addition to the structural elements illustrated in FIG. 1, a central processing unit (CPU) 201, random access memory (RAM) 202, read only memory (ROM) 203, a hard disk drive (HDD) 204, drivers 205, sensors 207, and a network interface 161. The drivers 205 correspond to drivable elements of the document conveying device 110, the image reading section 120, and the image forming section 140. The CPU 201, the RAM 202, the ROM 203, the HDD 204, the drivers 205, the operation panel 171, the sensors 207, and the network interface 161 are connected to one another via an internal bus 206.

A control program is for example stored in the ROM 203 or the HDD 204. The CPU 201 controls the MFP 100 through execution of the control program stored in the ROM 203 or the HDD 204. The CPU 201 uses the RAM 202 as a work area. The CPU 201 controls operation of the drivable elements by performing transmission and reception of data or commands with the drivers 205. The HDD 204 for example stores image data generated by the image reading section 120 or image data received from another apparatus via the network 162.

The operation panel 171 receives an operation from a user and supplies a signal to the CPU 201 based on the received operation. The operation panel 171 also displays an operation screen on a display thereof in accordance with a control signal from the CPU 201. The sensors 207 include a sensor for detecting opening and closing of the platen cover 102, a sensor for detecting a document on the document table 103, a temperature sensor of the fixing device 148, and a sensor for detecting a conveyed sheet or document.

Figure 3:
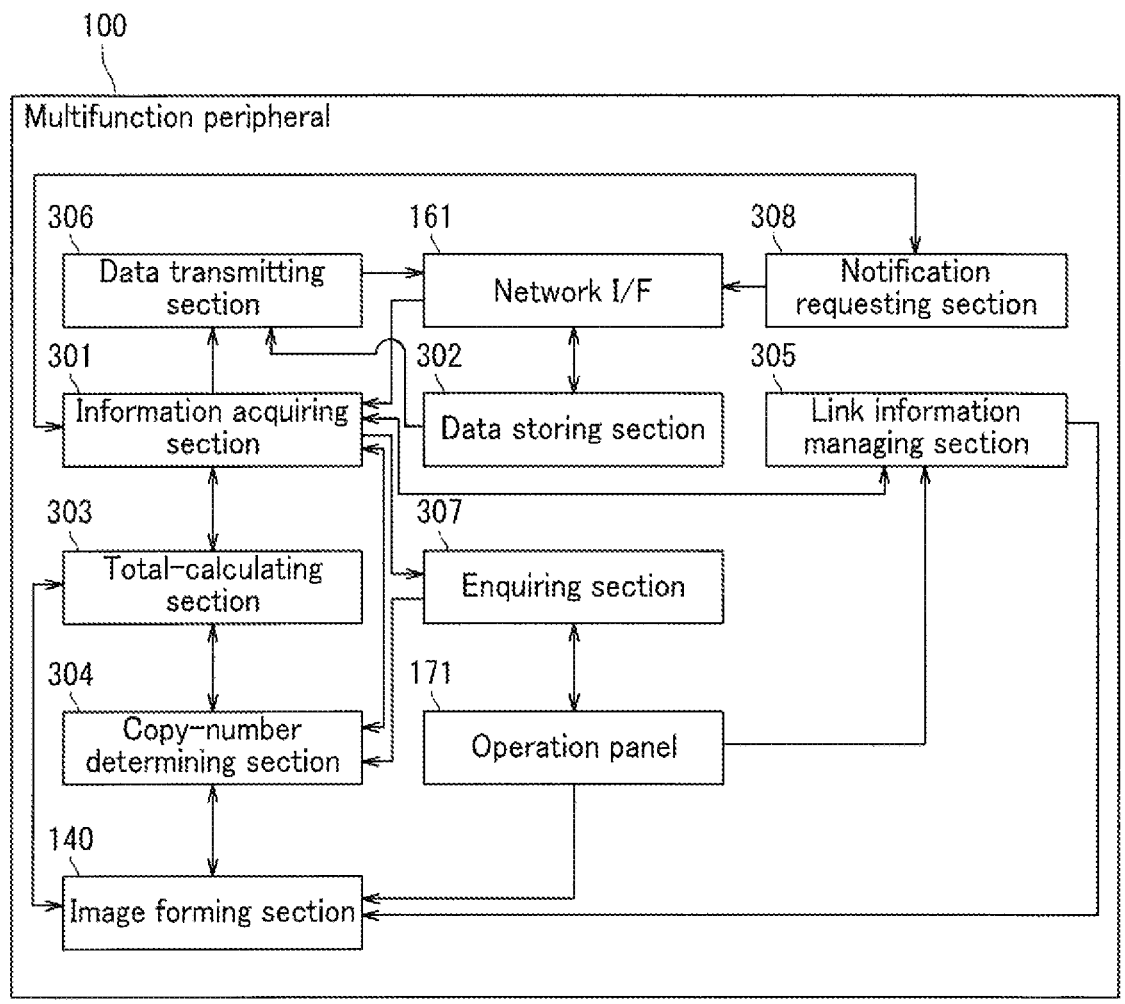
FIG. 3 is a functional block diagram of an MFP according to an embodiment.

The CPU 201 implements functions of functional blocks illustrated in FIG. 3 through execution of the control program.

FIG. 3 is a functional block diagram of the MFP 100 according to the embodiment. As illustrated in FIG. 3, the MFP 100 includes an information acquiring section 301 (acquiring section), a data storing section 302 (storing section), a total-calculating section 303, and a copy-number determining section 304 (determining section).

The information acquiring section 301 acquires, from each of one or more pre-designated target persons, a printing requirement notification indicating whether or not the target person requires printing, and further indicating a number of required copies when the target person requires printing. The target persons are users that are linked to a specific event such as a meeting. For example, when the event is a meeting, the target persons are users who have been invited to the meeting. The target persons are for example designated by an organizer of the meeting. In the present embodiment, target persons are preregistered in the information acquiring section 301 for each event. More specifically, identification information that identifies the target persons is pre-stored in the information acquiring section 301 for each event. The identification information identifying the target persons can for example be names, user IDs, or e-mail addresses of the target persons. In the present embodiment, names, user IDs, and e-mail addresses are stored in the information acquiring section 301 as information pertaining to the target persons.

Guidance for an event (referred to below as event guidance) is for example transmitted to each of the target persons by e-mail or distributed to each of the target persons as a paper copy. The event guidance for example includes information such as an event date, an event location, event contents, and a request for a notification, to the MFP 100, of whether or not printing is required of materials (referred to below as a handout) to be distributed at the event. In the present embodiment, as explained further below, the MFP 100 further includes a notification requesting section 308 that has a function of transmitting data of the event guidance to each of the target persons.

A printing requirement notification includes information indicating whether or not printing of a handout is required for a given event. In the present embodiment, the printing requirement notification includes event identification information, user identification information, and information indicating whether or not printing is required for each handout. When printing is required, the printing requirement notification further includes a number of required copies. When the target person desires that data be transmitted thereto, the printing requirement notification further includes transmission request information explained further below. The event identification information is information such as an event ID which identifies the event to which the printing requirement notification pertains. The user identification information is information such as a user ID or an e-mail address which identifies the target person from whom the printing requirement notification originated.

The data storing section 302 stores therein, for each of one or more events, output target data linked to the event. In the present embodiment, the output target data is data for a handout pertaining to the linked event, which in other words is a handout to be used at the event. Also, in the present embodiment, the HDD 204 functions as the data storing section 302.

The total-calculating section 303 calculates, based on one or more printing requirement notifications acquired by the information acquiring section 301, a total number of required copies indicated by the printing requirement notifications. In the present embodiment, the total-calculating section 303 calculates the total number of required copies indicated by the printing requirement notifications for each event and for each piece of output target data. For example, when printing requirement notifications are acquired from users X, Y, and Z, who are target persons for an event A, indicating whether or not printing is required for a handout P and a handout Q, the total-calculating section 303 calculates the total number of required copies indicated by the printing requirement notifications for each of the handouts P and Q.

The copy-number determining section 304 determines a final number of copies to be printed based on the calculation result of the total-calculating section 303. In the present embodiment, the copy-number determining section 304 determines a final number of copies to be printed for each handout.

The image forming section 140 prints an image based on output target data in accordance with the number of copies to be printed determined by the copy-number determining section 304. The output target data is data linked to the event indicated by the printing requirement notification which is acquired from the information acquiring section 301. The event indicated by the printing requirement notification is an event identified by event identification information included in the printing requirement notification, which in other words is an event to which the printing requirement notification pertains.

The MFP 100 further includes a link information managing section 305 (managing section), a data transmitting section 306, an enquiring section 307, and the notification requesting section 308.

The link information managing section 305 manages links between output target data and events. The link information managing section 305 links and stores therein, event identification information identifying an event and output target data (in the present embodiment, a storage location of the output target data) for the identified event.

The data transmitting section 306 transmits output target data stored in the data storing section 302 to an apparatus linked to a target person (referred to below as a first target person) who desires transmission of the output target data, based on transmission request information requesting transmission of the output target data. Herein, an apparatus linked to a target person (referred to below as a target apparatus) is for example an information processing terminal used by the target person. As explained above, in the present embodiment the e-mail addresses of the target persons are stored in the information acquiring section 301. The data transmitting section 306 transmits the output target data to the apparatus linked to the first target person by transmitting an e-mail with the output target data attached therein to the e-mail address of the first target person. As explained above, in the present embodiment the transmission request information is included in the printing requirement notification.

In a situation in which there are one or more target persons (referred to below as second target persons) who have not transmitted a printing requirement notification to the MFP 100, which in other words is a situation in which the information acquiring section 301 has not acquired a printing requirement notification from each of the second target persons, the enquiring section 307 enquires as to whether or not printing is required for the second target persons. For example, when there are one or more second target persons, a user of the MFP 100 (for example, a user, meeting organizer, or target person who inputs a printing instruction) instructs the enquiring section 307 whether or not printing is required for the second target persons. No particular limitation is placed on the method of enquiry. For example, when a printing instruction is input with respect to output target data, the MFP 100 may request a response from the user by displaying, for example on a display of the operation panel 171, an input column for whether or not printing is required for the second target persons. In such a situation, the user who inputs the printing instruction also indicates requirement of printing for the second target persons.

The notification requesting section 308 transmits, to one or more target apparatuses, request data that requests transmission of a printing requirement notification. In the present embodiment, the notification requesting section 308 has an e-mail transmission function. The notification requesting section 308 transmits the request data to the target apparatuses by transmitting an e-mail having the request data attached therein to the e-mail addresses of the target persons.

The following explains operation of the MFP 100 using an example in which a handout to be used at a meeting is printed.

Figure 4:
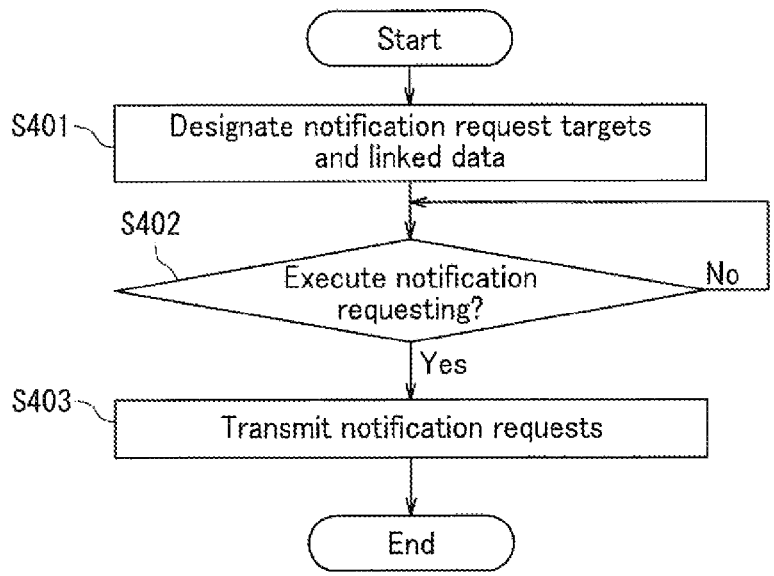
FIG. 4 is a flowchart illustrating a notification request process performed by an MFP according to an embodiment.

FIG. 4 is a flowchart illustrating a notification request process performed by the MFP 100 according to the embodiment.

The notification request process starts upon an organizer of a meeting (referred to below as a meeting organizer) inputting an instruction to the MFP 100, through the operation panel 171 or an information processing terminal, instructing performance of the notification request process. The meeting organized by the meeting organizer, which in other words is an event which is a target of the notification request process, is referred to below as a target event.

When the notification request process starts, the information acquiring section 301 requests designation of target persons (i.e., persons from whom notification is to be requested).

In response to the aforementioned request, the meeting organizer designates the target persons to whom event guidance is to be sent (Step S401).

No particular limitation is placed on the method by which the target persons are designated. For example, in a situation in which users of the MFP 100 are preregistered, the meeting organizer may designate the target persons from a list of the registered users. In another example, the meeting organizer may directly input information pertaining to the target persons into the MFP 100. As explained above, in the present embodiment names, user IDs, and e-mail addresses are stored in the information acquiring section 301.

At the above timing, the link information managing section 305 requests designation of data for a handout relating to the target event, which in other words is output target data linked to the target event (referred to below as linked data). In response to the aforementioned request, the meeting organizer designates linked data (Step S401).

No particular limitation is placed on the method by which the linked data is designated. For example, the MFP 100 may prompt the meeting organizer to designate handout data that is already stored in the MFP 100 or handout data that is not yet stored in the MFP 100 (i.e., new handout data). Storage of new handout data in the MFP 100 may for example be performed through the network 162 or through reading of a document by the image reading section 120. In a situation in which preparation of a handout is not yet complete, linked data may be designated by designating a file name or storage location (directory name) to be used when storing the handout in the MFP 100 upon completion thereof.

Note that in the present embodiment, the link information managing section 305 links and stores event identification information for the target event, such as an event name (i.e., a meeting name in the present example) and a storage location of the linked data.

Also, in the present embodiment, a storage location of handout data (linked data) is designated for each handout. In the present embodiment, in a situation in which a plurality of pieces of data are stored for a handout at the same storage location, the link information managing section 305 determines that the handout data is data having a most recent time stamp among the data stored at the stored location.

The meeting organizer inputs, to the MFP 100 (notification requesting section 308), information which is included in the event guidance relating to the target event, such as a date of the target event, a location of the target event, and contents of the target event. Note that a request for notification to the MFP 100 as to whether or not printing of the handout is required is automatically included in the event guidance.

Once the notification request targets and the linked data have been designated, the MFP 100 remains on standby until an instruction to execute notification requesting is input (Step S402: No). The instruction to execute notification requesting is for example input through the operation panel 171 or through an apparatus connected to the MFP 100 via the network 162. In another example, the instruction to execute notification requesting may be automatically input at a preset execution time.

Upon the instruction to execute notification requesting being input (Step S402: Yes), the notification requesting section 308 transmits, to each target apparatus, a notification request including data for the event guidance pertaining to the target event and request data requesting transmission of a printing requirement notification (Step S403).

Figure 5:
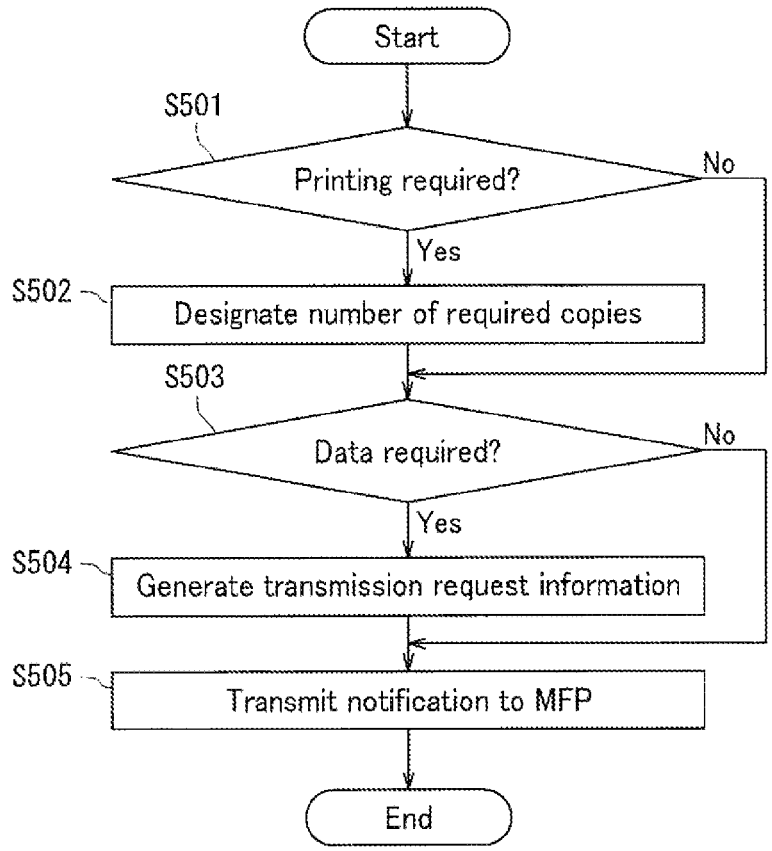
FIG. 5 is a flowchart illustrating a notification process performed by a target apparatus according to an embodiment.

FIG. 5 is a flowchart illustrating a notification process performed by a target apparatus according to the embodiment.

The notification process starts upon the target apparatus receiving the notification request from the MFP 100.

Upon the notification process starting, the target apparatus prompts the target person to input whether or not printing of the handout is required based on the event guidance transmitted to the target apparatus (Step S501).

In a situation in which printing of the handout is required (Step S501: Yes), the target apparatus prompts the target person to input a number of required copies, which is to be notified to the MFP 100 (Step S502). When there is a plurality of handouts, the target apparatus prompts the target person to input a number of required copies for each of the handouts. Next, the target apparatus proceeds to Step S503 of the process.

On the other hand, in a situation which printing of the handout is not required (Step S501: No), the target apparatus proceeds to Step S503 of the process.

The input in Steps S501 and S502 can be performed according to any appropriate method. For example, the MFP 100 may have a web server function and provide a web page pertaining to the event guidance through which input is performed. In another example, the target apparatus may transmit an e-mail addressed to the MFP 100, wherein the e-mail includes input information and is in a format that can be recognized by the MFP 100. The web server function can be implemented through execution by the CPU 201 of a web server program read, for example, from the HDD 204.

In Step S503, the target apparatus prompts the target person to input whether or not transmission of the handout data is required, based on the event guidance transmitted to the target apparatus.

In a situation in which transmission of the handout data is required (Step S503: Yes), the target apparatus generates transmission request information for notification to the MFP 100 (Step S504). When there is a plurality of different handouts, the target apparatus generates transmission request information requesting transmission of data for each of the handouts. Next, the target apparatus proceeds to Step S505 of the process.

On the other hand, in a situation in which transmission of the handout data is not required (Step S503: No), the target apparatus proceeds to Step S505 of the process.

In Step S505, the target apparatus generates a printing requirement notification for notification to the MFP 100 based on the information input by the target person. The target apparatus then transmits the generated printing requirement notification to the MFP 100. As explained above, the printing requirement notification includes event identification information, user identification information, and information indicating whether or not printing is required for each handout. When printing is required, the printing requirement notification further includes the number of required copies. When data transmission is required, the printing requirement notification further includes the transmission request information generated in Step S504.

Note that although in the present example, the target persons are able to request printing of the handout and transmission of the handout data at the same time, or indicate that printing and transmission are not required, in another example the target persons may only be able to request one out of the printing and the transmission. For example, in order to prevent the handout data being leaked in a situation in which the handout includes highly confidential information, the target persons may only be able to request printing and the printed handouts may be collected after the meeting.

Figure 6:
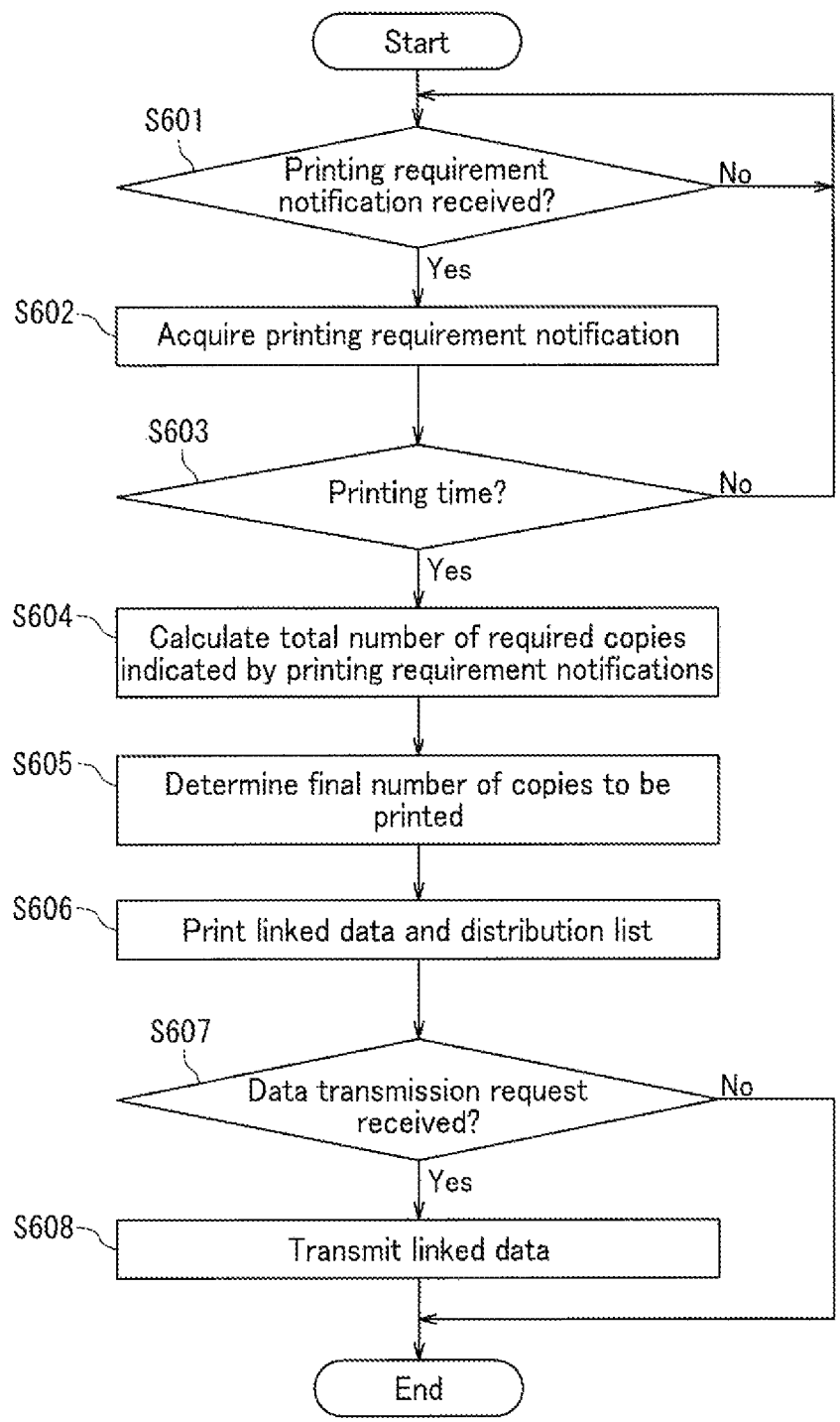
FIG. 6 is a flowchart illustrating a printing process performed by an MFP according to an embodiment.

FIG. 6 is a flowchart illustrating a printing process performed by the MFP 100 according to the embodiment.

The printing process is for example started by a trigger such as a notification request being transmitted or the power of the MFP 100 being switched on.

When the printing process starts, the MFP 100 remains on standby to receive a printing requirement notification (Step S601: No). Upon the MFP 100 receiving a printing requirement notification via the network 162 (Step S601: Yes), the information acquiring section 301 acquires the printing requirement notification which has been received (Step S602). Upon acquiring the printing requirement notification, the information acquiring section 301 inputs, to the total-calculating section 303, event identification information, user identification information, information indicating whether or not printing is required for each handout, and the number of required copies, which are each included in the printing requirement notification. Also, the information acquiring section 301 inputs, to the data transmitting section 306, the event identification information, the user identification information, and transmission request information for each of the handouts.

In the present embodiment, the information acquiring section 301 stores the printing requirement notification acquired thereby until a deletion instruction is input. Also, in a situation in which a plurality of printing requirement notifications have been received from a single target person, the information acquiring section 301 cancels information which has previously been input and inputs information included in a most recent of the printing requirement notifications with respect to the total-calculating section 303 and the data transmitting section 306.

Steps S601 and S602 of the process are repeated until a printing time for the handout is reached (Step S603: No). The printing time is for example input in advance by the meeting organizer during the notification request process. In another example, the printing time may be a time at which a printing instruction with respect to the handout is input through the operation panel 171.

Upon the printing time for the handout being reached (Step S603: Yes), the image forming section 140 acquires output target data linked to the target event (i.e., linked data) from the data storing section 302. The target event is identified by the event identification information included in the received printing requirement notification. The link between the target event and the linked data is managed by the link information managing section 305.

After acquiring the output target data, the image forming section 140 requests the copy-number determining section 304 to determine the final number of copies to be printed for the linked data. Upon receiving the aforementioned request, the copy-number determining section 304 instructs the total-calculating section 303 to calculate the total number of required copies indicated by printing requirement notifications.

Next, the total-calculating section 303 calculates, based on one or more printing requirement notifications that have been input from the information acquiring section 301, the total number of required copies indicated by the printing requirement notifications (Step S604). For example, suppose a situation in which there are three target persons—user X, user Y, and user Z—and that a printing requirement notification acquired from an apparatus linked to the user X indicates a number of required copies x (number of required copies for user X), a printing requirement notification acquired from an apparatus linked to the user Y indicates a number of required copies y (number of required copies for user Y), and a printing requirement notification acquired from an apparatus linked to the user Z indicates that printing is not required. In the above situation, the calculation result of the total-calculating section 303 is the sum total of the number of required copies x for the user X and the number of required copies y for the user Y. When there is a plurality of handouts, the total-calculating section 303 calculates a total number of required copies indicated by the printing requirement notifications for each of the handouts. The total-calculating section 303 inputs the calculation result thereof to the copy-number determining section 304.

The copy-number determining section 304 subsequently determines a final number of copies to be printed for the linked data based on the calculation result input from the total-calculating section 303 (Step S605). When there is a plurality of handouts, the copy-number determining section 304 determines a final number of copies to be printed for each of the handouts. The copy-number determining section 304 inputs the final number of copies determined thereby to the image forming section 140.

Note that during the above, the total-calculating section 303 enquires, to the information acquiring section 301, whether or not there are any second target persons (i.e., target persons who have not transmitted a printing requirement notification to the MFP 100). In a situation in which there are one or more second target persons, the information acquiring section 301 notifies the enquiring section 307 that there are one or more second target persons. Upon receiving notification as described above, the enquiring section 307 enquires to the meeting organizer, a target person, or a user who has input the printing instruction, whether or not to print a copy for each of the second target persons. The enquiring section 307 inputs a result of the enquiry to the copy-number determining section 304.

In a situation in which the enquiry result is that a copy is to be printed for each of the second target persons, the copy-number determining section 304 acquires the number of second target persons from the information acquiring section 301. The copy-number determining section 304 then determines the final number of copies to be printed by adding the number of second target persons which is acquired to the calculation result of the total-calculating section 303. On the other hand, in a situation in which the enquiry result indicates that copies are not to be printed for the second target persons, the copy-number determining section 304 determines that the final number of copies to be printed is the calculation result of the total-calculating section 303.

Upon the number of copies determined by the copy-number determining section 304 being input, the image forming section 140 prints the determined number of copies of an image (a handout in the present example) based on the linked data (Step S606). When there is a plurality of handouts, the image forming section 140 prints, with respect to each of the handouts, the final number of copies that is determined for the handout. At the same time as the above, the image forming section 140 also acquires the name of each of the target persons that has requested printing and a number of copies requested by each of the aforementioned target persons. The image forming section 140 then prints a list including the names of the target persons that have requested printing and the number of copies requested thereby. The above facilitates distribution of the printed handouts.

Also, at the same time as the above, based on transmission request information, the data transmitting section 306 transmits the linked data (handout data in the present example) to each apparatus linked to a first target person (i.e., a target person requesting transmission of the output target data). When there is a plurality of handouts, with respect to each of the handouts, the data transmitting section 306 transmits data of the handout to each apparatus linked to a target person requesting transmission of the handout data (i.e., a first target person with respect to the handout). In the present embodiment, the data transmitting section 306 transmits the linked data to the apparatus linked to the first target person by transmitting an e-mail with the linked data attached therein to the e-mail address of the first target person.

Also, in a situation in which the linked data is changed before the printing time (for example, new data is stored in the storage location of the linked data), as explained further above, the link information managing section 305 determines that the linked data is data having a most recent time stamp.

As explained above, the MFP 100 according to the present embodiment determines a number of copies to be printed based on printing requirement notifications received from one or more pre-designated target persons. Therefore, up until a time at which printing starts, the MFP 100 can adjust the number of copies to be printed in accordance with the preferences of the target persons. As a result, the MFP 100 can flexibly respond to a target person not attending at short notice or a person other than the target persons attending at short notice, and thus can print a number of copies of an image based on the output target data which is not excessive or insufficient. Also, due to the MFP 100 managing a link between the output target data and the event, it is not necessary to change the format of the printing requirement notification when the output target data is changed (for example, updated or replaced). Furthermore, the MFP 100 can transmit the output target data to a target person who requires the output target data but does not require a printed copy of the handout.

Note that the embodiment described above does not in any way limit the technical scope of the present disclosure. Also, a wide range of variations and applications other than those described above are also included within the scope of the present disclosure.

For example, in the present embodiment the MFP 100 includes the link information managing section 305, the data transmitting section 306, the enquiring section 307, and the notification requesting section 308, but the aforementioned elements are not essential elements of the present disclosure. Even in a configuration which does not include the aforementioned elements, printing of an image based on output target data can be performed in accordance with preferences of target persons such that printing is not performed excessively or insufficiently. In such a configuration, the MFP 100 transfers the event guidance to the target persons according to a different method.

Also, the order of steps shown in the each of the flowcharts illustrated in FIGS. 4-6 can be changed, so long as equivalent effects are achieved. For example, in FIG. 6 the linked data is transmitted after the final number of copies to be printed has been determined, but the order of such steps may be reversed or the steps may be performed in parallel.

Furthermore, the image forming apparatus is explained in the present embodiment using the MFP 100 as an example, but the image forming apparatus is not limited to being an MFP and may for example be a printer or a copier.

What is claimed is:

1. An image forming apparatus comprising:
    an acquiring section configured to acquire, from each of one or more pre-designated target persons, a printing requirement notification indicating whether or not the target person requires printing, and further indicating a number of required copies when the target person requires printing;
    a storing section configured to store output target data;
    a total-calculating section configured to calculate, based on one or more printing requirement notifications acquired by the acquiring section, a total number of required copies indicated by the printing requirement notifications;
    a determining section configured to determine a final number of copies to be printed based on a calculation result of the total-calculating section; and
    an image forming section configured to print an image based on the output target data in accordance with the final number of copies determined by the determining section, wherein
    when a plurality of printing requirement notifications have been received from a single target parson, the acquiring section cancels information that has previously been input and inputs information included in a most recent of the printing requirement notifications with respect to the total-calculating section,
    the storing section stores output target data for each of one or more events,
    the printing requirement notification includes information identifying one of the events,
    the image forming apparatus further comprises a managing section configured to manage links between the output target data and the events,
    the image forming section prints an image based on output target data of a handout that is a material to be distributed at an event indicated by the print requirement notification,
    the printing requirement notification includes event identification information, target person identifying information, information indicating whether or not printing is required for each handout, and information indicating a number of required copies of the handout, and
    the total-calculating section calculates a total number of required copies indicated by the print requirement notification for each of the events and for each piece of the output target data.

2. The image forming apparatus according to claim 1, further comprising
    a data transmitting section configured to transmit the output target data to an apparatus linked to a first target person among the target persons when the printing requirement notification acquired from the first target person includes transmission request information requesting transmission of the output target data.

3. The image forming apparatus according to claim 2, wherein
    the storing section stores output target data for each of one or more events,
    the printing requirement notification includes information identifying one of the events,
    the image forming apparatus further comprises a managing section configured to manage links between the output target data and the events, and
    the data transmitting section transmits, to the apparatus linked to the first target person, output target data linked to the event identified by the printing requirement notification acquired from the first target person.

4. The image forming apparatus according to claim 1, further comprising
    an enquiring section configured to cause, when a second target person from whom the acquiring section has not acquired a printing requirement notification is present among the target persons, a user of the image forming apparatus to instruct whether printing is required for the second target person, wherein the determining section determines the final number of copies to be printed based on the calculation result of the total-calculating section and based on an enquiry result of the enquiring section.

5. The image forming apparatus according to claim 1, further comprising
a notification requesting section configured to transmit data of event guidance including an event date, an event location, and event contents and request data requesting transmission of the printing requirement notification to one or more apparatuses linked to the target persons.

6. The image forming apparatus according to claim 1, wherein
the image forming section acquires from the total-calculating section, identification information of each target person requesting printing and a number of required copies requested thereby, and prints a list including the identification information of each of the target persons that have requested printing and the number of required copies requested thereby.

* * * * *